(12) United States Patent
Himmelbauer et al.

(10) Patent No.: US 12,259,039 B2
(45) Date of Patent: Mar. 25, 2025

(54) DEVICE FOR SWITCHING AT LEAST TWO PARTIAL GEAR MECHANISMS, AND ELECTRIC AXLE WITH SUCH A DEVICE

(71) Applicant: MAGNA Powertrain GmbH & Co KG, Lannach (AT)

(72) Inventors: Thomas Himmelbauer, Ernsthofen (AT); Helmut Wernick, Steyregg (AT); Martin Koenigsecker, Hargelsberg (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 0 days.

(21) Appl. No.: 18/437,274

(22) Filed: Feb. 9, 2024

(65) Prior Publication Data

US 2024/0280173 A1     Aug. 22, 2024

(30) Foreign Application Priority Data

Feb. 20, 2023   (DE) .......................... 102023201448.3

(51) Int. Cl.
| | |
|---|---|
| F16H 63/00 | (2006.01) |
| F16H 63/30 | (2006.01) |
| F16H 63/32 | (2006.01) |

(52) U.S. Cl.
CPC .......... *F16H 63/304* (2013.01); *F16H 63/32* (2013.01); *F16H 2063/3089* (2013.01)

(58) Field of Classification Search
CPC .................. F16H 63/304; F16H 63/32; F16H 2063/3089; F16H 63/08; F16H 63/30; F16H 61/26; B60K 17/06
See application file for complete search history.

(56) References Cited

FOREIGN PATENT DOCUMENTS

| | | |
|---|---|---|
| CN | 212616251 U | 2/2021 |
| CN | 216078256 U | 3/2022 |
| DE | 102018206392 A1 | 10/2019 |
| DE | 102020122657 A1 | 3/2022 |
| JP | 2012072829 A * | 4/2012 ............. F16H 63/32 |

* cited by examiner

*Primary Examiner* — Victor L MacArthur
(74) *Attorney, Agent, or Firm* — Dickinson Wright PLLC

(57) ABSTRACT

A device for switching at least two partial gear mechanisms, namely a first partial gear mechanism and a second partial gear mechanism, each having at least two gear stages. The device comprising an actuator connected for drive purposes to a rotatable component, a first switching device for switching the first partial gear mechanism and a second switching device for switching the second partial gear mechanism both of which are arranged on the rotatable component, and an electric drive axle for a motor vehicle comprising a first drive wheel, a second drive wheel and such a device.

8 Claims, 3 Drawing Sheets

DEVICE FOR SWITCHING AT LEAST TWO PARTIAL GEAR MECHANISMS, AND ELECTRIC AXLE WITH SUCH A DEVICE

CROSS-REFERENCE TO RELATED APPLICATIONS

This application claims priority to German Application No. DE 102023201448.3 filed Feb. 20, 2023. The entire disclosure of the above application is incorporated herein by reference.

FIELD OF THE INVENTION

The present invention is directed to a device for switching at least two partial gear mechanisms, namely a first partial gear mechanism and a second partial gear mechanism, each having at least two gear stages, comprising an actuator, wherein the actuator is connected for drive purposes to a rotatable component, wherein a first switching device for switching the first partial gear mechanism and a second switching device for switching the second partial gear mechanism are arranged on the rotatable component. The present invention is further directed to an electric drive axle for a motor vehicle equipped with such a device.

BACKGROUND OF THE INVENTION

This section provides information related to the present disclosure but which is not necessarily prior art.

Because of specifications relating to installation space, components and also costs in the design and development of motor vehicles, it is usually advantageous to exploit synergies within a structure. Such a synergy is provided, for example, by switching at least two independent partial gear mechanisms having at least two gears by means of a single actuator, since actuators require not only substantial cost and construction complexity but also significant installation space. Furthermore, switching often takes place only for a short period, which also leads to inefficient use of the actuators.

SUMMARY OF THE INVENTION

This section provides a general summary of the disclosure, and is not intended to be interpreted as a comprehensive disclosure of its full scope or all of its features.

It is an object of the invention to provide an improved device for independent switching of at least two partial gear mechanisms, and to provide an improved electric drive axle equipped with such a device.

The device according to the invention serves for independent switching of at least two partial gear mechanisms, namely a first partial gear mechanism and a second partial gear mechanism, each having at least two gear stages.

The device according to the invention comprises an actuator which is connected for drive purposes to a rotatable component.

According to the present invention, a first switching device for switching the first partial gear mechanism and a second switching device for switching the second partial gear mechanism are arranged on the rotatable component.

The first switching device and the second switching device each comprise:
- a sleeve arranged rotationally fixedly but axially movably on the rotatable component,
- a shift gate formed on the sleeve,
- a guide element arranged fixedly relative to the device and engaging the shift gate on the sleeve,
- a shift fork arranged axially movably on the sleeve and which engages in a sliding collar of the respective partial gear mechanism, and
- an elastic storage arrangement which can be loaded by the sleeve via a first carrier element arranged fixedly on the sleeve in order to transmit a load to the shift fork.

The first switching device and the second switching device are arranged on the rotatable component axially spaced from one another.

The directional designation "axial" describes a direction along or parallel to a central rotational axis of the rotatable component.

The rotatable component is preferably rotatable through 360° about the central rotational axis in both a first rotational direction and a second rotational direction opposite the first rotational direction.

In a preferred embodiment variant of the present invention, the sleeve of the respective switching device is rotationally fixedly connected to the rotatable component via a second carrier element.

The elastic storage arrangement preferably comprises a first spring and a second spring, wherein the first carrier element engages in the elastic storage arrangement between the first spring and the second spring.

The first spring and the second spring are preferably configured as compression springs.

Further preferably, the shift fork has a receiver for the elastic storage arrangement.

The electric drive axle according to the invention is used for example in a motor vehicle and comprises a first drive wheel, a second drive wheel and a device according to the present invention, wherein the first partial gear mechanism is assigned to the first drive wheel and the second partial gear mechanism is assigned to the second drive wheel, and each partial gear mechanism has at least two gear stages.

The present invention allows blocking-free switching of two partial gear mechanisms with just one actuator. The device according to the invention is distinguished by simple and compact mechanical construction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

DESCRIPTION OF THE INVENTION

Figure 1:
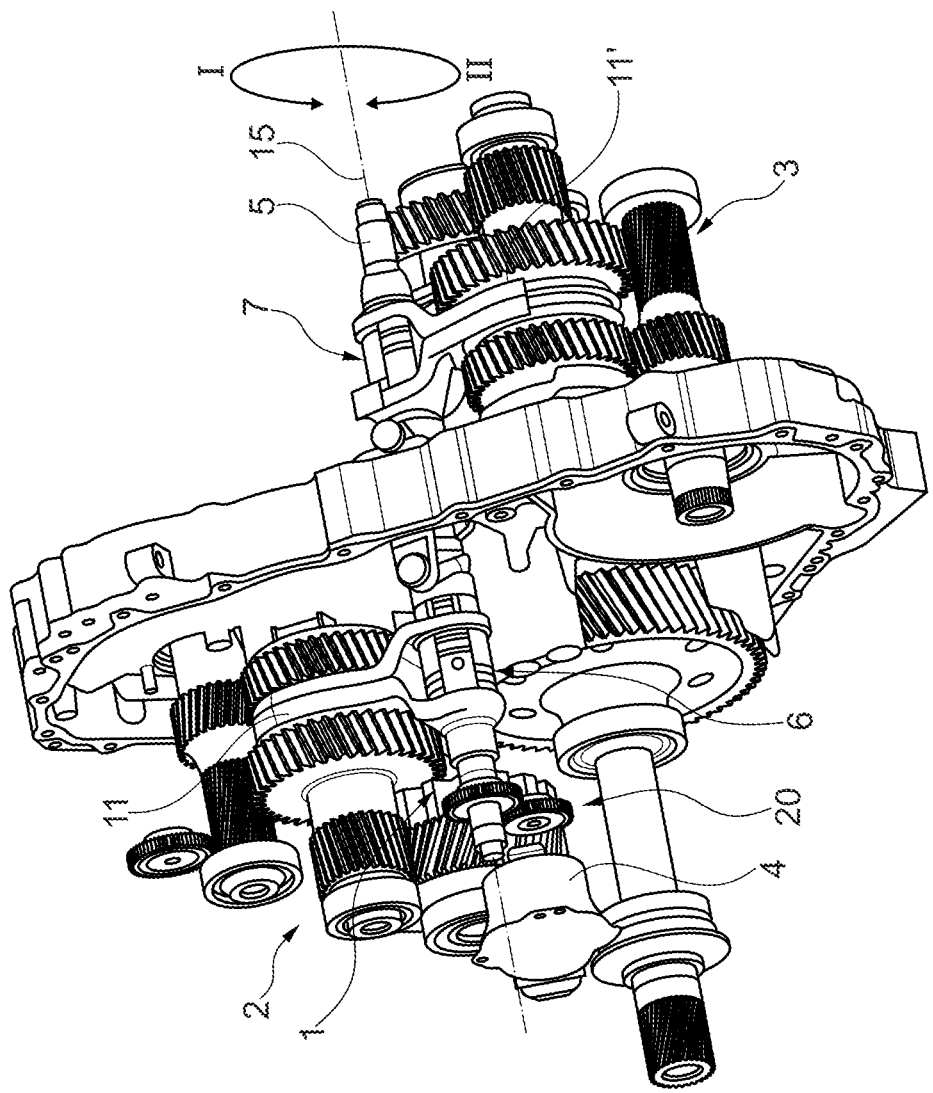
FIG. 1 shows a perspective view of an exemplary device, a first partial gear mechanism and a second partial gear mechanism.
Figure 2:
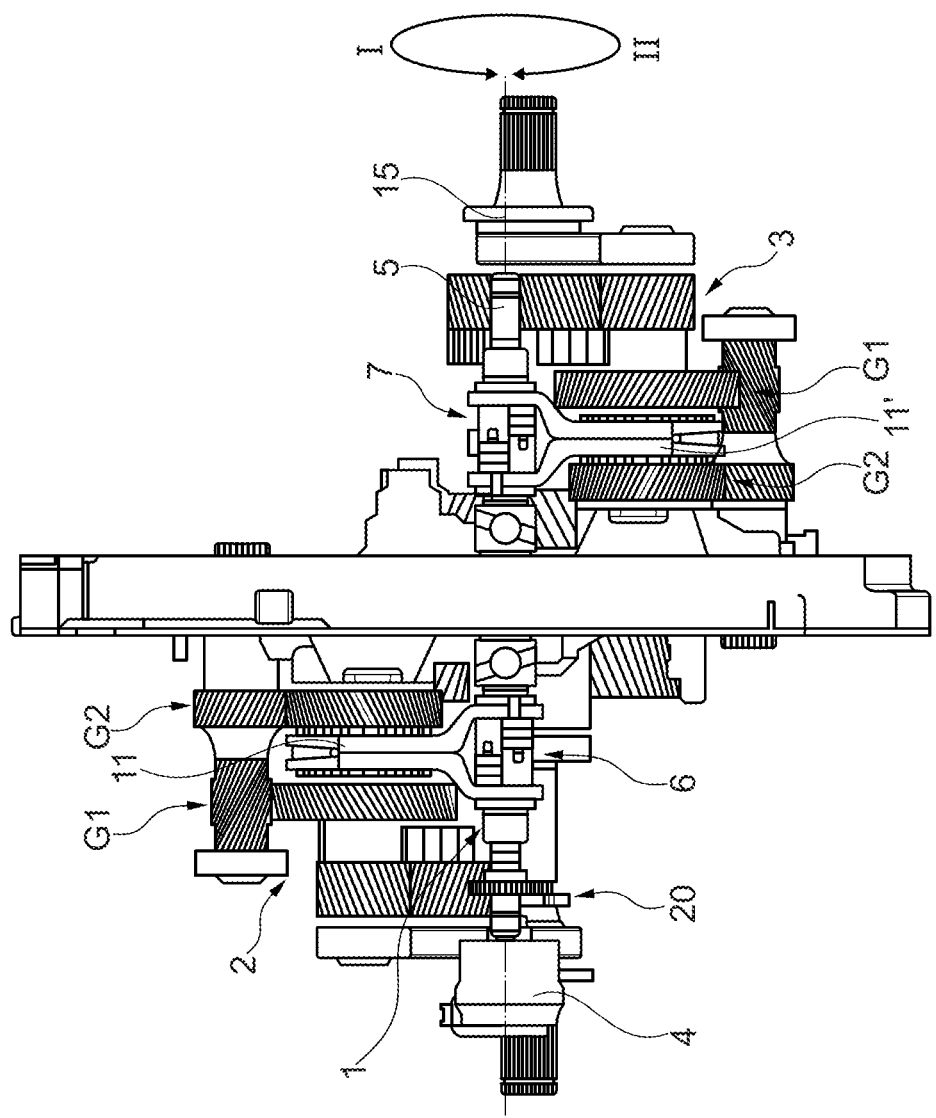
FIG. 2 shows a top view of a device, a first partial gear mechanism and a second partial gear mechanism according to FIG. 1.

FIG. 1 shows a device 1 according to the invention in connection with two mutually independent partial gear mechanisms 2, 3.

The device 1 comprises an actuator 4, namely an electric motor, and a rotatable component 5 (FIG. 1, 2).

The electric motor is connected for drive purposes to the rotatable component 5 via a translation stage 20 (FIG. 1, 2).

A first switching device 6 for switching the first partial gear mechanism 2 and a second switching device 7 for switching the second partial gear mechanism 3 are provided on the rotatable component 5. The first partial gear mechanism 2 and the second partial gear mechanism 3 each have two gears G1, G2 (FIG. 1, 2).

The first switching device 6 and the second switching device 7 are arranged on the rotatable component 5 of the device 1 axially spaced apart from one another (FIG. 1, 2).

The directional designation "axial" describes a direction along or parallel to a central rotational axis 15 of the rotatable component 5.

The rotatable component 5 is rotatable through 360° about the central rotational axis 15 in both a first rotational direction I and in a second rotational direction II opposite the first rotational direction I (FIG. 1, 2, 3).

Figure 3:
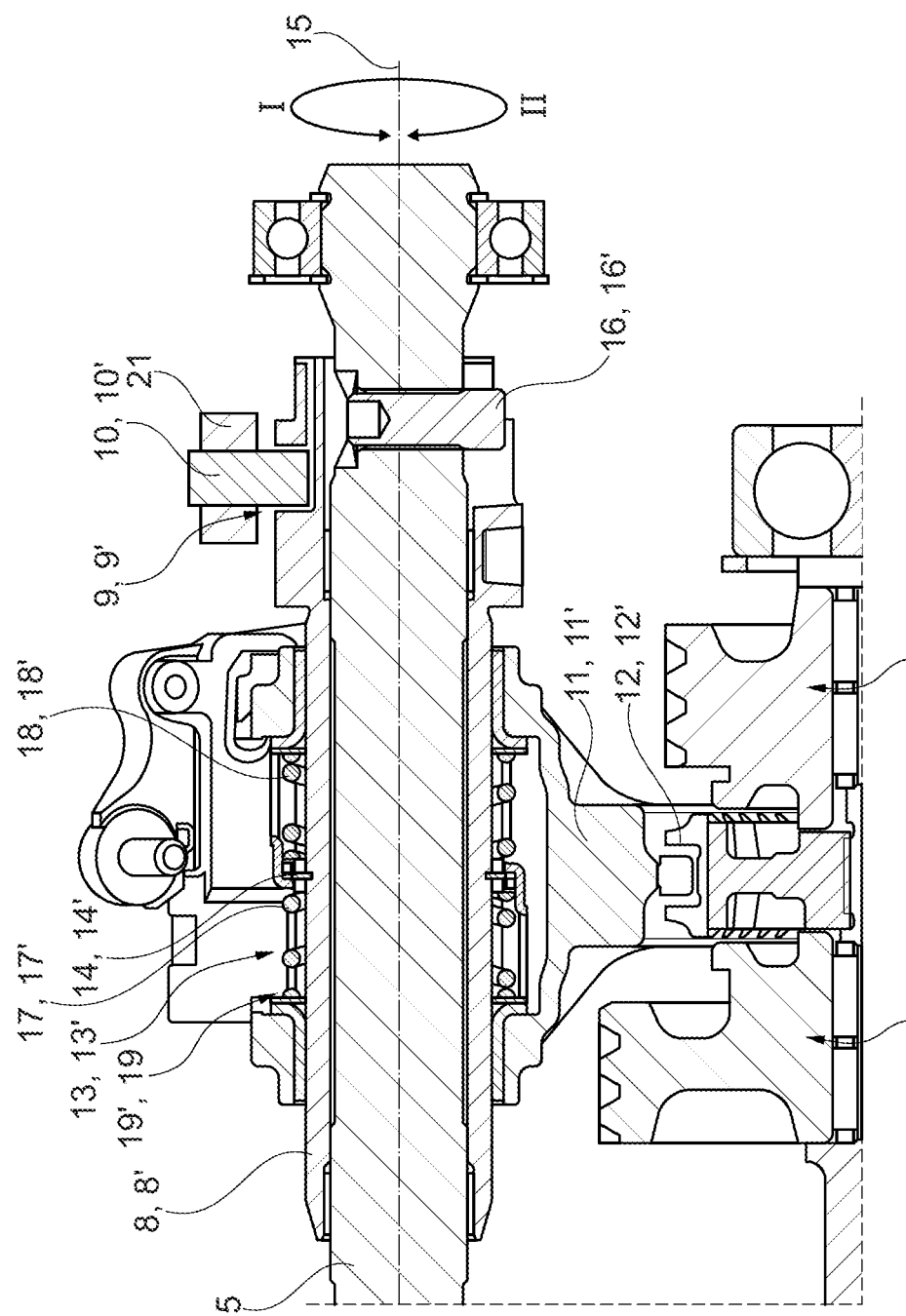
FIG. 3 shows a schematic illustration of a switching device and a partial gear mechanism.

The first switching device 6 and the second switching device 7 are formed identically with respect to their components, and each comprise a sleeve 8, 8', a shift gate 9, 9', a guide element 10, 10', a shift fork 11, 11', an elastic storage arrangement 13, 13', a first carrier element 14, 14' and a second carrier element 16, 16'. FIG. 3 shows an exemplary switching device 6, 7. Because of their identical design, in the description below of the first switching device 6 and the second switching device 7, only one "switching device 6, 7" will be described in detail (FIG. 3).

A distinction between the first switching device 6 and the second switching device 7 may lie purely in the design of the respective shift gate 9, 9'.

The sleeve 8, 8' of the switching device 6, 7 is formed substantially as a hollow cylinder and is arranged rotationally fixedly but axially movably on the rotatable component 5; the sleeve 8, 8' of the switching device 6, 7 is connected rotationally fixedly to the rotatable component 5 via a second carrier element 16, 16' (FIG. 3).

The shift gate 9, 9' is formed on the sleeve 8, 8', namely directly on an outer periphery of the sleeve 8, 8' (FIG. 3).

The guide element 10, 10' is arranged fixedly, i.e. rotationally and axially fixedly, on a housing 21 of the device 1 and permanently engages in the shift gate 9, 9' on the sleeve 8, 8' (FIG. 3).

The shift fork 11, 11' is arranged axially movably on the sleeve 8, 8' and engages in a sliding collar 12, 12' of the respective partial gear mechanism 2, 3 (FIG. 3).

The shift fork 11, 11' has a receiver 19, 19' for the elastic storage arrangement 13, 13' (FIG. 3).

The elastic storage arrangement 13, 13' is loaded by the sleeve 8, 8' via a first carrier element 14, 14', which is arranged fixedly on the sleeve 8, 8', in order to transmit a load to the shift fork 11, 11' (FIG. 3).

The elastic storage arrangement 13 comprises a first spring 17, 17' and a second spring 18, 18', wherein the first carrier element 14, 14' is fixedly arranged on sleeve 8, 8' and engages in the elastic storage arrangement 13, 13' between the first spring 17, 17' and the second spring 18, 18'. The first spring 17, 17' and the second spring 18, 18' are configured as compression springs (FIG. 3).

The sequence of switching via the device is described below. Upon actuation of the actuator 4, its torque is transmitted to the rotatable component 5 and both the first partial gear mechanism 2 and the second partial gear mechanism 3 are switched via the respective switching device 6, 7. Via the guide element 10, 10' of the respective switching device 6, 7 which is fixedly arranged on the device 1 and engages in the shift gate 9, 9' of the respective switching device 6, 7 and therefore moves the latter, and the second carrier element 16, 16' of the respective switching device 6, 7 which connects the rotatable component 5 rotationally fixedly to the sleeve 8, 8', the rotational movement of the rotatable component 5 is transformed into an axial movement of the sleeve 8, 8' of the respective switching device 6, 7 and hence of the shift fork 11, 11' of the respective switching device 6, 7 which is arranged on sleeve 8. The shift fork 11, 11' is connected to the sliding collar 12, 12' of the respective partial gear mechanism 2, 3. The first gear G1 and the second gear G2 of the respective partial gear mechanism 2, 3 can be switched via the sliding collar 12, 12' in that this engages in a gearwheel assigned to the respective gear G1, G2. An axial displacement of the shift fork 11, 11' axially displaces the sliding collar 12, 12' and the switching is carried out. The elastic storage arrangement 13, 13' of the respective switching device 6, 7 allows the electromechanical switching process to be completed without blockade, even if the synchronisation condition between the sliding collar 12, 12' and the gearwheel of the respective gear G1, G2 has not yet been reached-namely in the case of a "tooth-on-tooth" position between the sliding collar 12, 12' and the gearwheel of the respective gear G1, G2—because the storage arrangement temporarily stores the actuation force. In this case, after reaching the synchronisation condition between the sliding collar 12, 12' and the gearwheel of the respective gear G1, G2—namely a "tooth-on-gap" position between the sliding collar 12, 12' and the gearwheel of the respective gear G1, G2—the spring force temporarily stored in the elastic storage arrangement 13, 13' displaces the shift fork 11, 11' into the target position and the target gear G1, G2 is engaged. The function of the elastic storage arrangement 13, 13' is available in both switching directions, namely in the first rotational direction I and in the second rotational direction II of the rotatable component 5.

Because of the design of the device 1 according to the invention, it is possible to carry out a complete electromechanical switching process of two independent partial gear mechanisms 2, 3 simultaneously, wherein the target gear G1, G2 of the respective partial gear mechanism 2, 3 is automatically engaged only after reaching the synchronisation condition.

The actuator 4 may complete the switching movement on a switching command, i.e. carry out a complete rotation of the rotatable component 5 by 360° in the respective rotational direction I, II, irrespective of whether or not the synchronisation condition between the sliding collar 12, 12' and the gearwheel of the respective gear G1, G2 is fulfilled in each partial gear mechanism 2, 3; in the case that the synchronisation condition is not fulfilled in one or both partial gear mechanisms 2, 3, the energy is "temporarily stored" in the elastic storage arrangement 13, 13'. When the synchronisation condition is fulfilled, the shift fork 11, 11'/sliding collar 12, 12' completes the switching and the new gear G1, G2 is engaged.

A sensor at the shift fork 11 of the respective switching device 6, 7 establishes whether or not the synchronisation condition between the sliding collar 12, 12' and the gearwheel of the respective gear G1, G2 is fulfilled.

What is claimed is:

1. A device for switching at least two partial gear mechanisms, namely a first partial gear mechanism and a second partial gear mechanism, each having at least two gear stages, comprising: an actuator connected for drive purposes to a rotatable component; a first switching device for switching the first partial gear mechanism and a second switching device for switching the second partial gear mechanism and which are arranged on the rotatable component, wherein the first switching device and the second switching device each comprise:
- a sleeve which is arranged rotationally fixedly but axially movably on the rotatable component,
- a shift gate which is formed on the sleeve,
- a guide element which is arranged fixedly relative to the device and engages in the shift gate,
- a shift fork which is arranged axially movably on the sleeve and engages in a sliding collar of the respective partial gear mechanism, and
- an elastic storage arrangement which can be loaded by the sleeve via a first carrier element arranged fixedly on the sleeve, in order to transmit a load to the shift fork.

2. The device according to claim 1, wherein the first switching device and the second switching device are arranged on the rotatable component axially spaced from one another.

3. The device according to claim 1, wherein the rotatable component is rotatable through 360° about a central rotational axis in both a first rotational direction and in a second rotational direction opposite the first rotational direction.

4. The device according to claim 1, wherein the sleeve of the respective switching device is rotationally fixedly connected to the rotatable component via a second carrier element.

5. The device according to claim 1, wherein the elastic storage arrangement comprises a first spring and a second spring, and wherein the first carrier element engages in the elastic storage arrangement between the first spring and the second spring.

6. The device according to claim 5, wherein the first spring and the second spring are configured as compression springs.

7. The device according to claim 1, wherein the shift fork has a receiver for the elastic storage arrangement.

8. An electric drive axle for a motor vehicle, comprising a first drive wheel, a second drive wheel and a device according to claim 1, wherein the first partial gear mechanism is assigned to the first drive wheel and the second partial gear mechanism is assigned to the second drive wheel, and each partial gear mechanism has at least two gear stages.

* * * * *